United States Patent [19]

Fukuba et al.

[11] 3,969,291

[45] July 13, 1976

[54] INTUMESCENT FIRE-RETARDANT COATING COMPOSITIONS CONTAINING AMIDE-POLYPHOSPHATES

[75] Inventors: Kozo Fukuba; Yasutomo Ogushi, both of Niihama, Japan

[73] Assignee: Sumitomo Chemical Company, Limited, Osaka, Japan

[22] Filed: Mar. 6, 1975

[21] Appl. No.: 555,907

[30] Foreign Application Priority Data

Mar. 6, 1974    Japan ............................... 49-26574
June 17, 1974    Japan ............................... 49-69331

[52] U.S. Cl. .................................. 260/17.3; 260/9;
260/17.2; 260/29.2 R; 260/29.2 UA;
260/29.2 N; 260/DIG. 24; 428/921
[51] Int. Cl.² ........................................... C08L 3/02
[58] Field of Search ............. 260/17.2, 17.3, 2.5 FP;
428/920, 921

[56] References Cited

UNITED STATES PATENTS

| | | | |
|---|---|---|---|
| 3,372,131 | 3/1968 | Rohlfs et al. ...................... | 260/17.3 |
| 3,634,422 | 1/1972 | Nachbur et al. .................... | 428/921 |
| 3,681,060 | 8/1972 | Sello ................................. | 428/921 |
| 3,839,239 | 10/1974 | Godfried ........................... | 260/2.5 |

OTHER PUBLICATIONS

Chem. Absts. 70 (1969), 116332j, Intumescent Poly(-Vinyl Acetate) Coatings, Hahn et al.

*Primary Examiner*—Edward M. Woodbury
*Attorney, Agent, or Firm*—Sughrue, Rothwell, Mion, Zinn & Macpeak

[57] ABSTRACT

An intumescent fire-retardant coating composition containing, as a fire-retardant ingredient and an intumescent solid, a substantially water-insoluble amide polyphosphate condensate is disclosed.

13 Claims, No Drawings

INTUMESCENT FIRE-RETARDANT COATING COMPOSITIONS CONTAINING AMIDE-POLYPHOSPHATES

BACKGROUND OF THE INVENTION

1. Field of the Invention

This invention relates to an intumescent fire-retardant coating composition containing a substantially water insoluble amide polyphosphate condensate. More particularly, this invention relates to an intumescent coating composition exhibiting excellent fire-retardant properties when applied to inflammable building materials, interior decorative materials such as plywood or fibrous panels, insulated electric wires and so on.

2. Description of the Prior Art

It is well known that ammonium polyphosphate can be used as an excellent fire-retardant additive for an intumescent coating composition. For example, British Patent No. 1,171,491 discloses that intumescent coating compositions containing a suitable amount of ammonium polyphosphate achieved a Class A fire rating in the ASTM E-84-50T fire retardant test when applied to a panel of yellow poplar heartwood with a coverage of about 150 ft²/gal.

Ammonium polyphosphates used as a fire-retardant additive in conventional intumescent coating compositions are represented by the general formula:

$$H_{(n-m)+2}(NH_4)_m P_n O_{3n+1}$$

wherein $n$ is an integer having an average value greater than 10 and $m/n$ has an average value between 0.7 and 1.1, and are defined as having a water solubility of about 5 grams or less per 100 cc of water, evaluated by slurrying 10 grams of the solids in 100 cc of water for 60 minutes at 25°C.

Although the ammonium polyphosphate represented by the above formula is said to be "substantially water-insoluble", it is soluble in water to some extent since, in actuality, the solubility of 10 g of ammonium polyphosphate is about 1 to 5 g per 100 cc of water measured in the above-described manner. Hence, a coating composition containing this ammonium polyphosphate does not have sufficient water-resistance, moisture-resistance and weather-resistance, although it is superior to a coating composition containing conventional water-soluble ammonium phosphates such as ammonium dihydrogenphosphate.

Furthermore, there are very important requirements for an intumescent fire-retardant coating composition which is to be applied to insulated electric wires. Generally polyethylene, polyvinyl chloride, natural rubber, synthetic rubber and the like are used as an insulator for insulated electric wires. These are all inflammable materials and have low resistance to fire and high temperature. Thus, when the wires are exposed to a fire or high temperature, inferior insulation or a short circuit in the electric line can happen to result in very serious hazards. Further, polyvinyl chloride which has a relatively higher fire-retardant property has another problem in that a toxic halogen-containing gas is generated when it burns, even though it is fire-retardant initially.

Heretofore, generally a dispersion composition of antimony trioxide, inorganic fiber and so on in an organic synthetic resin emulsion or a mixture of a water-soluble phosphate derived from orthophosphoric acid and an organic synthetic resin or a reaction product thereof have been used as fire-retardant coating compositions for insulated wires, and these compositions have been applied to the surface of insulated wires by spraying or painting. However, fire-retardant coating compositions as described above have various defects with regard to the properties desired. The former composition does not form an intumescent layer having heat-insulating properties at the time of fire, since it does not contain an intumescent material. Accordingly, a large amount of the composition must be coated on the insulated wires in order to obtain a desired fire-retardant effect. On the other hand, the latter composition has inferior weather resistance since it contains a water-soluble material, although it is intumescent. That is, the coatings formed on insulated wires deteriorate remarkably and the fire-retardancy of the coatings decreases to a great extent when exposed under high moisture conditions or contacted with water.

As described above, both the conventional intumescent fire-retardant paint for the treatment of inflammable materials and the conventional intumescent fire-retardant coating composition for the treatment of insulated wires have considerable restrictions in practical use, since they do not have sufficient weather-resistance, particularly water-resistance and moisture-resistance.

As a result of an extensive investigation in order to eliminate such disadvantages, it has now been found that, when an intumescent fire-retardant coating composition containing a substantially water-insoluble amide polyphosphate condensate is coated on the surfaces of inflammable materials or insulated wires, the properties of the coating such as water-resistance, moisture resistance and weather-resistance can be greatly improved because of the extremely low solubility of the composition in water and, at the same time, the coating has superior fire-retardant properties because an effective heat-insulating layer is formed on substrates due to its intumescent properties.

SUMMARY OF THE INVENTION

Therefore, an object of this invention is to provide an intumescent coating composition which exhibits effective fire-retardant properties and has extremely low solubility in water.

Another object of this invention is to provide an intumescent coating composition suitable for coating a substrate such as an inflammable material and an insulated electric wire, to improve the fire-retardancy of the substrate.

The above as well as other objects of this invention will become apparent from the following detailed description.

According to the present invention the intumescent fire-retardant coating composition comprises an aqueous dispersion of (A) a substantially water-insoluble amide polyphosphate condensate, (B) a film forming binder, and (C) a carbonific material, with (A), (B) and (C) comprising from 20 to 90% by weight, preferably from 40 to 80% by weight, of the total composition.

DETAILED DESCRIPTION OF THE INVENTION

As described above, the present invention provides an intumescent fire-retardant coating composition containing a substantially water-insoluble amide polyphosphate condensate.

According to the present invention an excellent fire-retardant effect can be obtained with minor amounts of a fire-retardant coating composition, since the heat-insulating layer formed by intumescence is very thick. Further, the use of an amide polyphosphate condensate as a fire-retardant in the present invention makes it possible greatly to reduce the loss of the retardant occurring generally on exposure for a long time under high temperature and high moisture conditions in comparison with an intumescent coating composition containing conventionally known retardants; consequently, the present intumescent coating composition has excellent water-resistance and moisture-resistance, resulting in long lasting fire-retardant effects. Furthermore, the deposition of crystals on the coating surface generally encountered when conventional ammonium orthophosphate is used does not occur with the intumescent coating composition according to this invention, and the intumescent coating composition does not contain toxic components such as antimony trioxide so that the surface coating is quite safe.

Additionally, the intumescent coating composition according to the present invention is particularly effective as a surface coating on insulated wires to prevent a reduction of insulation ability in electrical lines. That is, thermoplastic resins such as polyethylene and polyvinyl chloride which are generally used as the insulating sheath of electric wires melt by heating and then result in an inferior insulation. The coating composition of the present invention is intumescent and a very thick heat-insulating layer is formed by heating the applied surface coating of the present composition greatly retarding the transmission of heat to the thermoplastic resin sheath and preventing a melting of the sheath. Therefore, the present composition is suitable particularly for applications to such synthetic resin sheathed electric wires.

The substantially water-insoluble amide polyphosphate condensate used in the present invention is a polyphosphate containing nitrogen in the form of an amide and can be prepared by heat-condensing together a phosphoric acid containing material such as ammonium orthophosphate, orthophosphoric acid, polyphosphoric acid, phosphoric anhydride, urea phosphate and a mixture thereof, and a nitrogen source such as a cyanamide derivative such as melamine, dicyanamide or a mixture thereof in the presence of a condensing agent selected from the group consisting of urea, urea phosphate or a mixture thereof. Further, in view of the insolubility in water of the amide polyphosphate condensate produced, urea phosphate and melamine are preferably used to produce the present amide polyphosphate condensate.

Thus, the amide polyphosphate condensate can be prepared by heat-condensing a mixture of a phosphoric acid containing material and a cyanamide derivative using a condensing agent in such a proportion that the urea : phosphoric acid containing material (as $H_3PO_4$): cyanamide derivative molar ratio is equal to about 0.8 : 1 : 0.05 to about 1.5 : 1 : 1, preferably 0.9 : 1 : 0.2 to 1.2 : 1 : 1, under an ammonia gas atmosphere at a temperature of from about 150 to about 350°C for a period of from about 10 minutes to about 10 hours, preferably 1 to 6 hours.

The term "substantially water-insoluble" as used in the present invention means a solubility of about 1 g or less per 100 cc of water as determined by placing 10 g of the amide polyphosphate condensate in 100 cc of water at a temperature of 25°C. Known ammonium polyphosphates represented by the general formula

$$H_{(n-m)+2}(NH_4)_m P_n O_{3n+1}$$

wherein n is an integer having an average value greater than about 10, and m/n is between about 0.7 and about 1.1 have a relatively low solubility of about 2 g or less per 100 cc of water at normal temperature (e.g., 25°C). However, the substantially water-insoluble amide polyphosphate condensates used in the present invention have an even lower solubility of about 1 g or less per 100 cc of water at normal temperature (e.g., 25°C). Additionally, the solubility of the ammonium polyphosphates increases as the elution temperature is elevated whereas that of the amide polyphosphate condensates used in this invention scarcely increases with elevation of the elution temperature. Therefore, almost no loss of the fire-retardancy occurs even if the materials coated with the intumescent fire-retardant coating composition containing the amide polyphosphate condensate are contacted with water at relatively high temperatures. The relationship between the elution temperature and the percentage elution with respect to conventional ammonium polyphosphates and the substantially water-insoluble amide polyphosphate condensates, respectively, was determined and is shown in the following Table.

Table 1

| Percentage Elution[1] | Elution Temperature (°C) | | | | | | |
|---|---|---|---|---|---|---|---|
| | 30 | 40 | 50 | 60 | 70 | 80 | 95 |
| Ammonium Polyphosphate (%) | 21 | 35 | 62 | 89 | 95 | 98 | 100 |
| Amide Polyphosphate Condensate (%) | 2 | 4 | 5 | 6 | 7 | 8 | 9 |

[1]Percentage eluted material when 10 g of the sample is placed in 100 cc of water and stirred at a given temperature for 1 hour (hereinafter the same).
Ammonium polyphosphate: N, 14.20 wt%; $P_2O_5$, 72.15 wt.%; percentage elution, 15.3%; pH: 5.60 as a 1% by weight solution
Amide polyphosphate condensate: N, 33.48 wt.%; $P_2O_5$, 44.73 wt.%; percentage elution, 1.36%; pH: 8.26 as a 1% by weight solution The intumescent fire-retardant coating composition of the present invention intumesces when heated or a flame is applied thereto and forms a heat-insulating layer on the coated surface, which protects the substrate material from heat. The substantially water-insoluble amide polyphosphate condensate acts as an intumescent solid together with a carbonific material in the intumescent coating composition of the present invention. That is, on thermal decomposition, the amide polyphosphate condensate generates nonflammable gases to produce a uniform foam in the coating.

The content of the amide polyphosphate condensate in the composition ranges from about 5 to 90%, preferably 10 to 80%, by weight based on the total weight of the solids present in the intumescent coating composition. Insufficient fire-retardancy is obtained if the amount of the amide polyphosphate condensate is less than about 5% by weight. On the other hand, if the amount of the amide polyphosphate condensate is more than about 90% by weight, the viscosity of the composition is high and thus the coating operation and workability decrease and an insufficient intumescent layer is formed.

The film forming binder suitable for use in the intumescent coating composition is a polymer solution in an organic solvent or an aqueous emulsified polymer solution (generally referred to as an "emulsion") and is, in general, used in amounts to provide from about 2 to 60%, preferably 4 to 50%, by weight, on a solids basis, based on the total weight of the solids present in the intumescent coating composition.

If the amount of the binder solids is less than about 2% by weight, the strength of the film formed is decreased and the binding strength between the other solid additives is reduced. If the amount of the binder solids is more than about 60% by weight, the fire-retardancy of the composition is reduced.

A preferred film forming binder is an emulsion containing 30 to 70% by weight solids. A preferred emulsion is one which contains polyvinyl acetate, polyacrylonitrile, polyvinyl chloride, polyvinylidene chloride, a copolymer of vinyl acetate and an acrylate, a copolymer of vinyl acetate and ethylene, a copolymer of vinyl chloride and an acrylate or the like. Of these binders, a particularly preferred binder is a copolymer of vinyl acetate and ethylene, since cracking of the film is prevented and the water-resistance and moisture-resistance is increased. Further, a thermosetting resin can be added when a still higher water-resistance is required for the film. Typical examples of thermosetting resins which can be used are a ureaformaldehyde resin, a phenol resin, an epoxy resin, an unsaturated polyester resin, a melamine-formaldehyde resin, a urea-melamine resin, a methylated melamine resin and the like. Of these thermosetting resins, a most preferred resin is a methylated melamine resin from the standpoint of compatibility with other materials and workability. A suitable amount of the thermosetting resin is not more than about 70%, preferably 2 to 40%, by weight, on a solids basis, based on the total weight of the solids present in the intumescent coating composition, although the amount will depend on the kind of resin to be used.

The carbonific material used in the present coating composition is a material which yields carbon on carbonization and intumescent solids which intumesce when heated or fire is applied thereto. Suitable carbonific materials for use in the intumescent coating composition include a saccharide such as starch, modified starch and the like and a polyhydric alcohol such as the hexitols, the pentitols, pentaerythritol and the like. Carbonific materials having a high carbon content and a high hydroxy group content are preferred. Starch and pentaerythritol, particularly pentaerythritol, are preferred. The amount of the carbonific material used in the intumescent coating composition is not less than about 2%, preferably 2 to 50%, by weight based on the total weight of the solids present in the intumescent coating composition in order to obtain an intumescent layer having sufficient effects.

In addition, various other additives such as inorganic fibers (asbestos, glass fiber), dyes, pigments, swelling agents, wetting agents, dispersing agents, anti-foaming agents, fungicides or bactericides, and the like can be incorporated into the intumescent fire-retardant composition, if desired, in order to improve the uniformity and dispersion of foam, and the strength, flexibility and ductility of the film.

The inorganic fiber has the function of maintaining the strength of the intumescent layer when the composition swells and forms a heat-insulating layer during a fire. When a composition is coated on wires, cracks of the film sometimes occur when the film cannot endure elongation and shrinkage and bending. The inorganic fiber also prevents cracks from occurring. However, incorporation of an inorganic fiber into a composition degrades the dispersability during the manufacture of the composition and tends to cause a decrease in workability, e.g., coating, particularly difficulties such as choking of a spray-gun, where spray-coating is employed. Excess amounts of inorganic fiber are not preferred since an excess amount prevents the formation of an effective intumescent layer. Accordingly, the amount of the inorganic fiber in the composition must be adjusted so as to range from about 0 to 20% by weight based on the total weight of the solids present in the intumescent coating composition. Inorganic fibers which can be used include various kinds of asbestos such as chrysotile and amosite, various fibers such as glass fibers and rock wool.

The coating amount of the intumescent fire-retardant coating composition of the present invention can be varied depending on the kind and quality of materials to be coated and protected. More than about 300 g/m$^2$ is required in the case of three layer lauan plywood having a thickness of about 5.5 mm in order to achieve a fire-retardancy of Grade 3 in the JIS A-1321 combustion test. In the case of insulated wires an amount of more than about 250 g/m$^2$ is required in order to obtain sufficient fire-retardancy. When the wires are distributed through walls or boards, the composition can be packed into those spaces as a fire-retardant sealing agent. Further, the composition of the present invention has the ability to form an excellent intumescent heat-insulating layer and, accordingly excellent fire-retardancy can be obtained when it is applied to iron beams or pillars.

In the formulation of the intumescent fire-retardant coating composition, a high speed rotating dissolver, pebble mill and the like can be suitably used in the present invention. If desired, various other additives as described above can be incorporated into the composition during the formulation such as dispersing agents, anti-foaming agents, pigments, fungicides or bactericides and the like in minor amounts.

As described above, the intumescent fire-retardant coating composition of the present invention which contains a substantially water-insoluble amide polyphosphate condensate has excellent fire-retardancy, water-resistance and weather-resistance and therefore the coated surface is stable for a long period of time and the fire-retardancy lasts for a long period of time.

The present invention will be illustrated in greater detail by the following Examples, but the present invention is not to be construed as being limited to these Examples and various modifications are possible within the scope of the present invention. Unless otherwise indicated herein, all parts, percents, ratios and the like are by weight.

EXAMPLE 1

A substantially water-insoluble amide polyphosphate condensate (N, 31.48 wt.%; P$_2$O$_5$, 47.27 wt.%; percentage elution, 1.31%; pH 8.30 as a 1% solution) was prepared by heat-condensing a mixture of urea phosphate and melamine in a molar ratio of urea : phosphoric acid (as H$_3$PO$_4$) : melamine of 1 : 1 : 0.5 for 3 hours at 260° – 280°C. Using the thus prepared amide polyphosphate condensate the following intumescent fire-retardant coating composition was prepared.

| Component | Parts by weight |
|---|---|
| Amide Polyphosphate Condensate | 40.0 |
| Pentaerythritol | 7.6 |
| Ethylcellulose (1% aq. soln.) | 7.6 |
| Anti-foam Agent (Silicone KM72 produced by The Shin-Etsu Chemical Industry Co., Ltd.) | 0.2 |
| Dispersing Agent (polyethylene glycol alkylphenyl ether, Noigen EA-143 produced by Daiichi Kogyo Seiyaku Co., Ltd.) | 0.2 |
| Ethylene-Vinyl Acetate Copolymer Emulsion (about 55% solids, Sumikaflex 510 produced by Sumitomo Chemical Co., Ltd.) | 10.4 |
| Melamine Resin (Sumimal M 50 w produced by Sumitomo Chemical Co., Ltd.) | 9.0 |
| Hardening Agent (organic amine derivative, Sumitex Accelerator ACX produced by Sumitomo Chemical Co., Ltd.) | 3.0 |
| Water | 22.0 |

The composition was applied to a panel of three-layer lauan plywood having a thickness of 5.5 mm at a coverage of 450 g/m², and the resulting panel was heat-dried for 90 minutes at 80°C to produce a fire-retardant plywood panel. This fire-retardant plywood panel was subjected to the test method for incombustibility of internal finish materials and procedures for buildings according to JIS A-1321 (Japanese Industrial Standard), and the results obtained are shown in Table 2.

Table 2

| Exhaust Temperature (°C) | | | | | | T.dθ (°C x min) | Smoking Coefficient | After Flame (sec) | Cracks in** Back | Judgement |
|---|---|---|---|---|---|---|---|---|---|---|
| 1* Min | 2 Min | 3 Min | 4 Min | 5 Min | 6 Min | | | | | |
| 85 | 95 | 105 | 192 | 245 | 275 | 0 | 11.7 | 0 | Not observed | Passed the third grade of fire-retardancy |

*Elapsed time
**According to JIS A-1321

Further, in the hot water-resistance test prescribed in JAS (Japanese Agricultural Standard) Class 2 (immersion in hot water at 70°C for 2 hours), the condition of the coating surface was good and almost the same as that before immersion.

EXAMPLE 2

Using the same amide polyphosphate condensate as that described in Example 1, the following intumescent fire-retardant coating composition was prepared.

| Component | Parts by weight |
|---|---|
| Amide Polyphosphate Condensate | 35.0 |
| Pentaerythritol | 8.2 |
| Ethylcellulose (1% aq. soln.) | 7.6 |
| Anti-foam Agent (same as Example 1) | 0.2 |
| Dispersing Agent (same as Example 1) | 0.2 |
| Ethylene-Vinyl Acetate Copolymer Emulsion (same as Example 1) | 20.8 |
| Titanium Oxide | 6.0 |
| Water | 22.0 |

The above composition was applied to a panel of three-layer lauan plywood having a thickness of 5.5 mm at a coverage of 400 g/m² and the resulting panel was heat-dried for 120 minutes at 60°C to obtain a fire-retardant plywood panel. The resulting panel was subjected to the incombustibility test according to JIS A-1321, and the results obtained are shown in Table 3.

Table 3

| Exhaust Temperature (°C) | | | | | | T.dθ (°C x min) | Smoking Coefficient | After Flame (sec) | Cracks in** Back | Judgement |
|---|---|---|---|---|---|---|---|---|---|---|
| 1* Min | 2 Min | 3 Min | 4 Min | 5 Min | 6 Min | | | | | |
| 73 | 85 | 90 | 175 | 240 | 280 | 0 | 24.0 | 2 | No observed | Passed the third grade of fire-retardancy |

*Elapsed time
**According to JIS A-1321

Further, the condition of the coated surface was also relatively good in the hot-water-resistance test according to JAS Class 2.

EXAMPLE 3

Using the same amide polyphosphate condensate as described in Example 1, the following intumescent fire-retardant coating composition was prepared.

| Component | Parts by weight |
|---|---|
| Amide Polyphosphate Condensate | 45.0 |
| Pentaerythritol | 7.0 |
| Ethylcellulose (1% aq. soln.) | 5.8 |
| Anti-foam Agent (same as Example 1) | 0.2 |
| Dispersing Agent (same as Example 1) | 0.2 |
| Ethylene-Vinyl Acetate Copolymer Emulsion (about 50% solids, Sumikaflex 751 produced by Sumitomo Chemical Co., Ltd.) | 16.0 |
| Melamine Resin (same as Example 1) | 6.0 |
| Hardening Agent (same as Example 1) | 2.0 |
| Water | 17.8 |

The above composition was applied to a polyethylene sheath wire of a three axial type having a size of 5.5 mm² at a coverage of 500 g/m², and the resulting wire was allowed to stand for 2 days at room temperature (i.e., 20°–30°C). In the incombustibility test, a Meckel burner prescribed in JIS L-1091 was used, and the sample wire was held horizontal to the flame length of 65 mm, and the time required for the sample wire to ignite and other items were measured. Further, the sample wire was immersed in warm water for 2 days at 60°C and, after drying a similar test was conducted. The results obtained are shown in Table 4.

Table 4

| Sample | Ignition Time | After Flame (sec) | After Glow (sec) |
| --- | --- | --- | --- |
| Allowed to Stand in a Room | No ignition for 20 Minutes | 0 | 0 |
| Immersed in Warm Water | " | 0 | 0 |
| Blank (not coated) | Ignited in 30 sec. | ∞ | — |

As can be seen from the results in Table 4, both the sample which was allowed to stand in a room and the sample which was immersed in warm water exhibited excellent fire-retardancy.

EXAMPLE 4

Using the same amide polyphosphate condensate as described in Example 1, the following intumescent fire-retardant coating composition was prepared.

| Component | Parts by weight |
| --- | --- |
| Amide Polyphosphate Condensate | 40.0 |
| Pentaerythritol | 7.8 |
| Dispersing Agent (same as Example 1) | 0.2 |
| Ethylene-Vinyl Acetate Copolymer Emulsion (same as Example 3) | 22.0 |
| Ethylcellulose (1% aq. soln.) | 4.0 |
| Titanium Oxide | 3.0 |
| Asbestos | 4.0 |
| Water | 19.0 |

The above composition was applied to a polyethylene sheath wire of a three-axial type having a size of 5.5 mm$^2$ at a coverage of 600 g/m$^2$, and the resulting wire was dried for 2 days at room temperature. One part of the sample wire was allowed to stand for a week at 30°C under an atmosphere of 95% relative humidity, and then dried. This sample was subjected to the similar incombustibility test as in Example 3. The results obtained are shown in Table 5.

Table 5

| Sample | Ignition Time | After Flame (sec) | After Glow (sec) |
| --- | --- | --- | --- |
| Allowed to Stand in a Room | No ignition for 20 minutes | 0 | 0 |
| Allowed to Stand under High Humidity | " | 0 | 0 |

As can be seen from the results in Table 5 above, both samples allowed to stand in a room and under high humidity exhibited excellent fire-retardancy.

COMPARISON EXAMPLE

Using sparingly water-soluble ammonium polyphosphate (N, 14.20 wt.%; P$_2$O$_5$, 72.15 wt.%; percentage elution, 15.3%; pH 5.60 as a 1% solution), the following intumescent fire-retardant coating composition was prepared.

| Component | Parts by weight |
| --- | --- |
| Ammonium Polyphosphate | 28.0 |
| Pentaerythritol | 7.0 |
| Melamine | 7.0 |
| Ethylcellulose (1% aq. soln.) | 5.8 |
| Dispersing Agent (same as Example 1) | 0.2 |
| Ethylene-Vinyl Acetate Copolymer Emulsion (same as Example 3) | 22.0 |
| Melamine Resin (same as Example 1) | 6.0 |
| Hardening Agent (same as Example 1) | 2.0 |
| Water | 22.0 |

The above composition was applied to a polyethylene sheath wire of a three-axial type having a size of 5.5 mm$^2$ at a coverage of 500 g/m$^2$ and the resulting wire was allowed to stand for 2 days at room temperature. The incombustibility test was conducted similar to Example 3. Further, the sample wire was immersed in warm water at 60°C for 2 days and, after drying a similar test was conducted with this sample. The results obtained are shown in Table 6.

Table 6

| Sample | Ignition Time | After Flame (sec) | After Glow (sec) |
| --- | --- | --- | --- |
| Allowed to Stand in a Room | No ignition for 20 minutes | 0 | 0 |
| Immersed in Warm Water | Ignited in 3 minutes | ∞ | — |

As can be seen from the results in Table 6 above, the sample which was allowed to stand in a room exhibited good fire-retardancy, but the sample immersed in warm water was deteriorated considerably.

While the invention has been described in detail and with reference to specific embodiments thereof, it will apparent to one skilled in the art that various changes and modifications can be made therein without departing from the spirit and scope thereof.

What is claimed is:

1. An intumescent fire-retardant coating composition comprising an aqueous dispersion of (A) a substantially water-insoluble amide polyphosphate condensate comprising the heat-condensation product of a phosphoric acid-containing material selected from the group consisting of ammonium orthophosphate, orthophosphoric acid, polyphosphoric acid, phosphoric anhydride, urea phosphate and mixtures thereof with a cyanamide derivative selected from the group consisting of melamine, dicyanamide or mixtures thereof, as nitrogen source in the presence of a condensing agent selected from the group consisting of urea, urea phosphate and a mixture thereof in a molar ratio of 0.8:1:0.05 to 1.5:1:1 of urea : phosphoric acid-containing material (as $H_3PO_4$) : cyanamide derivative at a temperature of from about 150° to 350°C, (B) a film forming binder comprising a polymer solution in an organic solvent or an aqueous emulsified polymer solution, and (C) a carbonific material selected from the group consisting of a saccharide and a polyhydric alcohol, with (A), (B) and (C) comprising from about 20 to 90% by weight of the total composition.

2. The composition according to claim 1, wherein said amide polyphosphate condensate is present in an amount of about 5 to 90% by weight on a solids basis to the total weight of solids present in said composition.

3. The composition according to claim 2, wherein said amide polyphosphate condensate is present in an amount of from 10 to 80% by weight based on the total weight of solids present in said composition.

4. The composition according to claim 1, wherein said film forming binder is present in an amount of from about 2 to 60% by weight on a solids basis based on the total weight of the solids present in said composition.

5. The composition according to claim 4, wherein said film forming binder is present in an amount of from 4 to 50% by weight on a solids basis based on the total weight of the solids present in said composition.

6. The composition according to claim 1, wherein said film forming binder is an emulsion containing polyvinyl acetate, polyacrylonitrile, polyvinyl chloride, polyvinylidene chloride, a copolymer of vinyl acetate and an acrylate, a copolymer of vinyl acetate and ethylene, or a copolymer of vinyl chloride and an acrylate.

7. The composition according to claim 6, wherein said film forming binder is an emulsion containing a copolymer of vinyl acetate and ethylene.

8. The composition according to claim 1, wherein said carbonific material is starch or pentaerythritol.

9. The composition according to claim 1, wherein said carbonific material is present in an amount of not less than about 2% by weight based on the total weight of the solids present in said composition.

10. The composition according to claim 9, wherein said carbonific material is present in an amount of from 2 to 50% by weight based on the total weight of the solids present in said composition.

11. The composition according to claim 1, wherein said composition additionally contains a thermosetting resin in an amount of not more than about 70% by weight based on the total weight of the solids present in said composition.

12. The composition according to claim 11, wherein the thermosetting resin is present in an amount of from 2 to 40% by weight based on the total weight of the solids present in said composition.

13. The composition according to claim 1, wherein said composition additionally contains at least one of an inorganic fiber, a dye, a pigment, a swelling agent, a wetting agent, a dispersing agent, an anti-foaming agent, a fungicide and a bactericide.

* * * * *